(12) United States Patent
Mas et al.

(10) Patent No.: US 11,295,885 B2
(45) Date of Patent: Apr. 5, 2022

(54) CURRENT TRANSFORMER, PROTECTION DEVICE AND ELECTRICAL CIRCUIT BREAKER INCLUDING SUCH A TRANSFORMER

(71) Applicant: SCHNEIDER ELECTRIC INDUSTRIES SAS, Rueil-Malmaison (FR)

(72) Inventors: Patrick Mas, Saint Martin d'Heres (FR); Xiaodong Shi, Saint Egreve (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 160 days.

(21) Appl. No.: 16/684,928

(22) Filed: Nov. 15, 2019

(65) Prior Publication Data

US 2020/0176166 A1    Jun. 4, 2020

(30) Foreign Application Priority Data

Nov. 29, 2018  (FR) ...................................... 18 72079

(51) Int. Cl.
*H01F 27/00*    (2006.01)
*H01F 27/24*    (2006.01)
(Continued)

(52) U.S. Cl.
CPC ........... *H01F 27/008* (2013.01); *H01F 27/24* (2013.01); *H01F 38/28* (2013.01); *H01H 71/7463* (2013.01); *H02H 1/0007* (2013.01)

(58) Field of Classification Search
CPC ........ H01F 27/008; H01F 27/24; H01F 38/28; H01H 71/7463; H02H 1/0007
See application file for complete search history.

(56) References Cited

U.S. PATENT DOCUMENTS

| | | | | |
|---|---|---|---|---|
| 1,710,862 A | * | 4/1929 | Chryst | H01F 38/12 |
| | | | | 361/270 |
| 4,068,275 A | * | 1/1978 | Teel | H02H 3/286 |
| | | | | 361/44 |

(Continued)

FOREIGN PATENT DOCUMENTS

| | | | |
|---|---|---|---|
| DE | 23 59 756 A1 | 6/1975 | |
| EP | 2322788 A1 * | 5/2011 | ............. F02M 37/32 |

(Continued)

OTHER PUBLICATIONS

French Preliminary Search Report dated Sep. 16, 2019 in French Application 18 72079, filed on Nov. 29, 2018 (with English Translation of Categories of Cited Documents and Written Opinion).

*Primary Examiner* — Adolf D Berhane
*Assistant Examiner* — Afework S Demisse
(74) *Attorney, Agent, or Firm* — Oblon, McClelland, Maier & Neustadt, L.L.P.

(57) ABSTRACT

The current transformer includes a magnetic circuit made of magnetic material that is intended to be placed around a primary conductor, and a secondary winding that is wound onto a portion of the magnetic circuit in order to deliver a secondary current to processing circuits. In this current transformer the magnetic circuit includes at least one device for varying the magnetization of a portion of the magnetic circuit according to the temperature in order to limit or to decrease the magnetic flux in the magnetic circuit when the temperature of the magnetic circuit increases. The protection device and the electrical circuit breaker include such a transformer.

14 Claims, 5 Drawing Sheets

(51) Int. Cl.
*H01H 71/74* (2006.01)
*H02H 1/00* (2006.01)
*H01F 38/28* (2006.01)

(56) References Cited

U.S. PATENT DOCUMENTS

| | | | | |
|---|---|---|---|---|
| 2014/0144903 | A1* | 5/2014 | Findlay | H05B 6/44 |
| | | | | 219/643 |
| 2015/0263515 | A1* | 9/2015 | Schuster | H01F 29/00 |
| | | | | 336/155 |

FOREIGN PATENT DOCUMENTS

| | | | |
|---|---|---|---|
| FR | 1 163 942 | A | 10/1958 |
| FR | 2 725 320 | A1 | 4/1996 |
| FR | 2 999 013 | A1 | 6/2014 |

* cited by examiner

CURRENT TRANSFORMER, PROTECTION DEVICE AND ELECTRICAL CIRCUIT BREAKER INCLUDING SUCH A TRANSFORMER

TECHNICAL FIELD

The invention relates to a current transformer comprising: a magnetic circuit made of magnetic material that is intended to be placed around a primary conductor; and a secondary winding that is wound onto a portion of said magnetic circuit in order to deliver a secondary current to a processing circuit.

The invention also relates to a protection device and a circuit breaker comprising such a current transformer.

PRIOR ART

Figure 1:
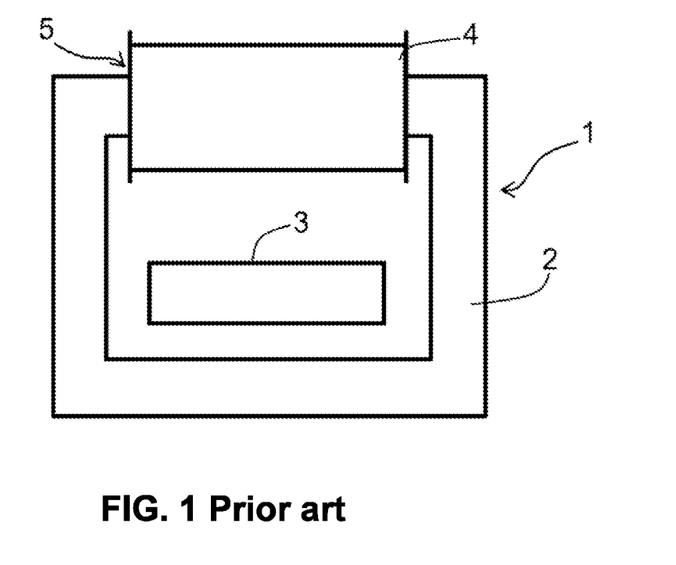
FIG. 1 shows a current transformer of the prior art.

A known current transformer 1 is shown in FIG. 1. It comprises a magnetic circuit 2 that is intended to be placed around a primary conductor 3, and a secondary winding 4 that is wound onto a portion 5 of said magnetic circuit. The magnetic circuit is often produced as stacked sheets. These sheets are predominantly made up of iron and are designed to operate at the frequencies of the electricity grid, in particular at 50 Hz or 60 Hz.

When the fundamental frequency of the electricity grid increases and exceeds 100 Hz or when a high-frequency current or current harmonics are superposed on the load current circulating in the primary conductor 3, energy losses are generated in the iron of the magnetic circuit. These iron losses result in heating of the magnetic circuit, as well as of the components adjoining or in contact with the magnetic circuit.

These temperature increases are especially significant when the transformers are integrated in isolating casings with other electrical or electronic components. The use of isolating casings ensures that electrical isolation is provided between the primary conductor 3 and the rest of the electrical equipment associated with the current transformer.

DISCLOSURE OF THE INVENTION

The aim of the invention is a current transformer capable of avoiding or reducing temperature increases in the magnetic circuit, as well as a protection device and a circuit breaker comprising such a current transformer.

In a current transformer comprising a magnetic circuit made of magnetic material that is intended to be placed around a primary conductor, and a secondary winding that is wound onto a portion of said magnetic circuit in order to deliver a secondary current to a processing circuit according to the invention, the magnetic circuit comprises at least one device for varying the magnetization of a portion of said magnetic circuit according to the temperature in order to limit or to decrease the magnetic flux in the magnetic circuit when the temperature of the magnetic circuit increases.

Preferably, the device for varying magnetization limits the circulation of the magnetic flux to a value that is less than 50% of the value at 20° C. when the temperature is higher than 150° C.

Advantageously, the device for varying magnetization creates an additional complete or partial gap in the magnetic circuit in order to limit the circulation of the magnetic flux when the temperature exceeds a predetermined threshold. Preferably, said predetermined threshold is between 120° C. and 180° C.

According to a first preferred embodiment of the invention, the device for varying magnetization comprises a mechanical device housed in a recess of the magnetic circuit in order to produce a gap or to increase a gap by opening the magnetic circuit when the temperature reaches said predetermined threshold.

Advantageously, the mechanical device comprises bi-metal strips, which are mounted head-to-tail and are housed in a recess in order to effect a separation of the magnetic circuit, generating a gap.

Preferably, the mechanical device comprises from 6 to 12 bi-metal strips. Advantageously, said gap is greater than 0.5 mm when the temperature is higher than 120° C. or the magnetic circuit experiences a temperature increase of 120 K.

According to a second preferred embodiment of the invention, the device for varying magnetization comprises a static device housed in a section of said magnetic circuit, said static device being made up of a magnetic material having a Curie point or a Curie temperature that is lower than that of the magnetic material of the magnetic circuit.

Preferably, the material of the static device has a Curie temperature between 80° C. and 200° C.

Advantageously, the material of the static device is predominantly made up of iron-nickel or of ferrite.

Preferably, the material of the static device comprises cutouts for avoiding current losses through eddy currents.

An electronic protection device according to the invention comprising an electronic processing unit connected to at least one current transformer, and delivering an electronic signal in response to protection functions, comprises a current transformer as defined above having a secondary winding connected to said processing unit in order to deliver a secondary measurement or electrical power supply current.

An electrical circuit breaker according to the invention comprising at least one main electrical contact for interrupting a current in an electrical circuit, a mechanism for controlling the opening of said electrical contact and a protection device delivering a control signal to said control mechanism comprises at least one current transformer as defined above connected to a processing unit of said protection device.

BRIEF DESCRIPTION OF THE DRAWINGS

Further advantages and features will become more clearly apparent from the following description of particular embodiments of the invention, which are provided by way of non-limiting examples and are shown in the accompanying drawings, in which.

DETAILED DESCRIPTION OF EMBODIMENTS

FIG. 1 shows a current transformer 1 comprising a magnetic circuit 2 made of magnetic material that is intended to be placed around a primary conductor 3, and a secondary winding 4 that is wound onto a portion 5 of the magnetic circuit 2 in order to deliver a secondary current to processing circuits. The magnetic circuit comprises sheets that are predominantly made up of iron and are designed to operate at the frequencies of the electricity grid, in particular at 50 Hz or 60 Hz.

Figure 2:
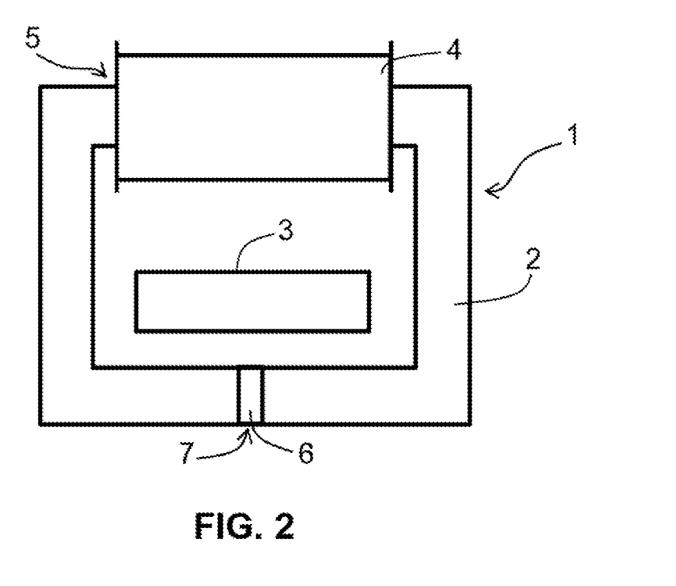
FIG. 2 shows a current transformer according to a first embodiment of the invention.

In order to avoid heating the magnetic circuit when energy losses in the iron of the magnetic circuit increase, the magnetic circuit comprises at least one device 6 for varying the magnetization of a portion 7 of said magnetic circuit in order to limit or to decrease the magnetic flux in the magnetic circuit when the temperature of the magnetic circuit increases. FIG. 2 shows a current transformer according to one embodiment of the invention with a device 6 interposed in a section 7 of the magnetic circuit.

The energy losses in the iron of the circuit particularly increase when the fundamental frequency of the electricity grid increases and exceeds 100 Hz or when a high-frequency current or current harmonics are superposed on the load current circulating in the primary conductor 3.

For example, the device for varying magnetization limits the circulation of the magnetic flux to a value that is less than 50% of the value at 20° C. when the temperature is higher than 150° C. In a preferred embodiment, the device for varying magnetization creates an additional complete or partial gap in the magnetic circuit in order to limit the circulation of the magnetic flux when the temperature exceeds a predetermined threshold. Thus, the device 6 is a device for limiting magnetic flux according to the temperature. The advantage of such a device involves not creating an additional gap at a low current level, for which good energy transfer to the secondary winding is required. Furthermore, at a low current level the heating remains low.

Figure 3:
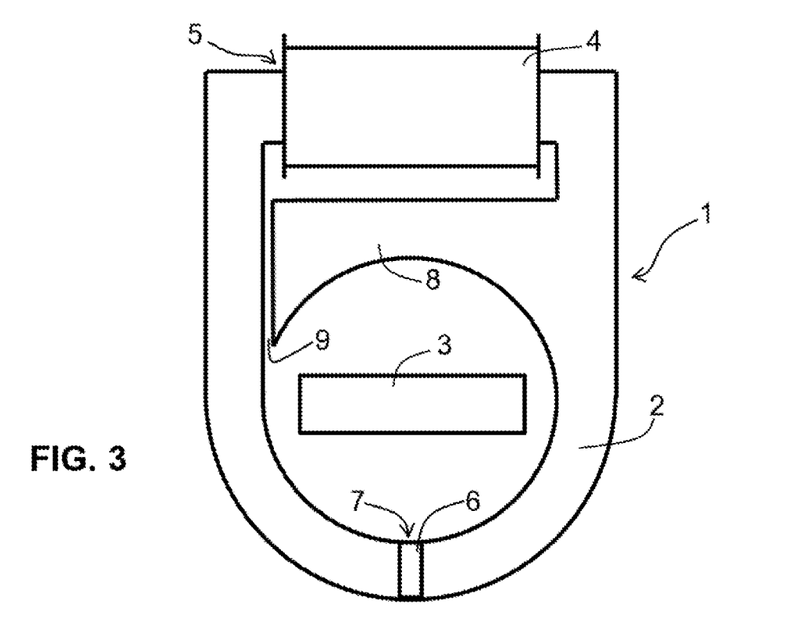
FIG. 3 shows a current transformer according to a second embodiment of the invention.

FIG. 3 shows a current transformer according to another embodiment of the invention. The magnetic circuit has a partly round shape and comprises a magnetic shunt 8 with a gap 9. The shunt 8 diverts a magnetic flux when the magnetization of the magnetic circuit exceeds a predetermined level, so as to reduce the flux in the portion 5 of the magnetic circuit receiving the secondary winding 4. The purpose of the shunt 8 is to limit the secondary current of the winding 4 when the current in the primary conductor increases. In the embodiment of FIG. 3, the shunt 8 is produced from the same sheets as the magnetic circuit 2. However, other embodiments are possible. For example, shunts can be added onto the magnetic circuit and produced from a different material, in particular from iron powder for better regulation of the current in the secondary winding.

Figure 4:
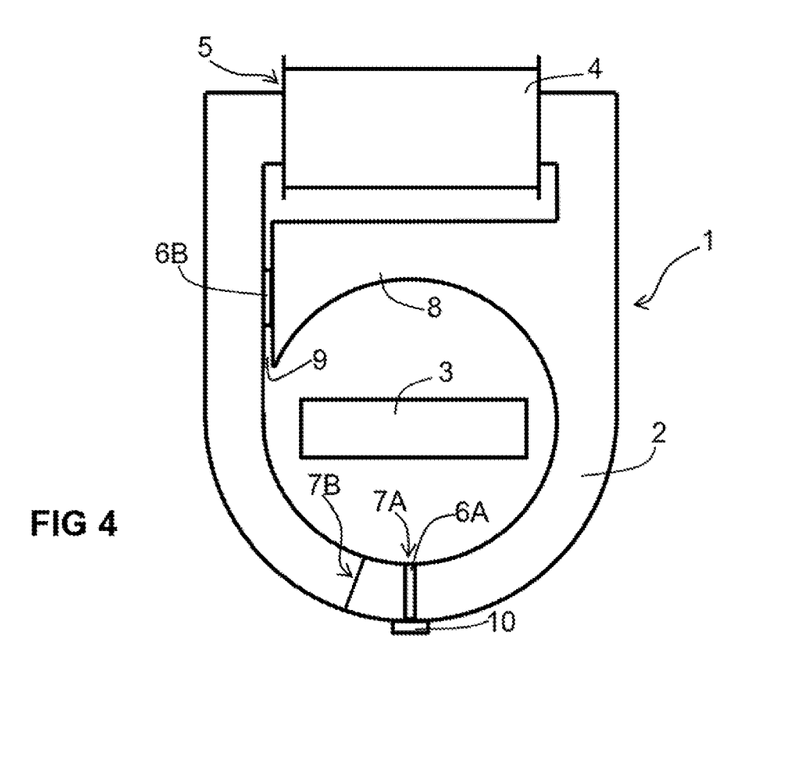
FIG. 4 shows a current transformer according to a third embodiment of the invention.
Figure 5:
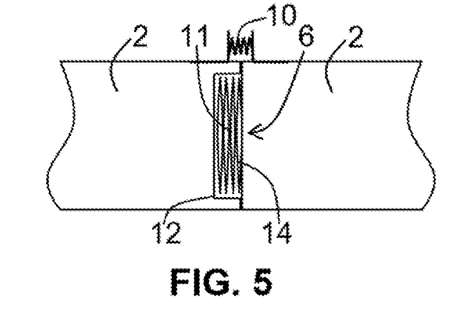
FIGS. 5 to 8 show arrangements of a first mechanical embodiment of a device for varying magnetization.
Figure 6:
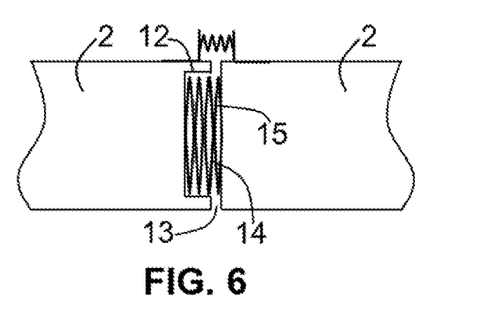
Figure 7:
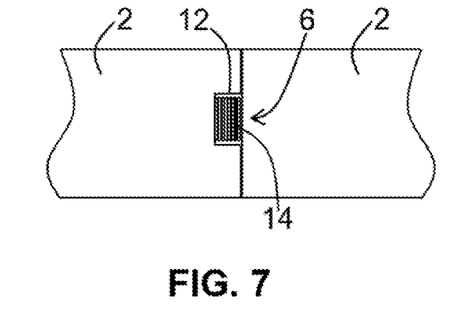
Figure 8:
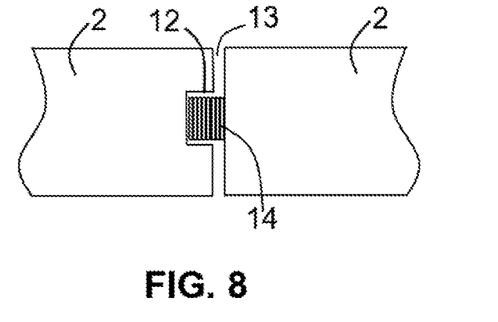

Another embodiment of a current transformer according to the invention is shown in FIG. 4. A device 6A for varying the magnetization of a portion 7A of said magnetic circuit is retained by a retention device 10 of the magnetic circuit. If the device 6A is mechanical, the retention device 10 is also used to ensure the return to the normal position. A device 6B for varying the magnetization of a portion 7B of said magnetic circuit also can be disposed in the gap 9 of the shunt 8. In this case, if the device 6B is a mechanical device and if an opening is placed on the portion 7B of the magnetic circuit remote from the device 6B, then a larger opening is possible on the portion 7B in order to reduce the magnetization of the magnetic circuit 2.

According to a first embodiment of the device for limiting magnetic flux according to the temperature that is shown in FIGS. 5 to 8, the device 6 for varying magnetization comprises a mechanical device 11 housed in a recess 12 of the magnetic circuit 2 in order to produce a gap 13 or to increase a gap by opening the magnetic circuit 2 when the temperature reaches said predetermined threshold. Preferably, said predetermined threshold is between 120° C. and 180° C.

The mechanical device 11 creates an additional gap, which will increase from a threshold temperature. To this end, the mechanical device 11 comprises strips 14 of bi-metal, which are mounted head-to-tail and are housed in the recess 12 in order to effect a separation of the magnetic circuit, thus generating a gap 13. The recess 12 allows the bi-strips to be retained in position so as to produce a thrust perpendicular to the deformation thereof under the effect of the temperature. A retention device 10 of the magnetic circuit comprises a return spring for ensuring correct closure of the magnetic circuit or the re-closure thereof and to avoid noise.

Thus, the deflection of the bi-metal strips separates the edges of the gap starting from a set temperature. In this case, the mechanical resiliency of the magnetic circuit is used, therefore the operation is reversible. A separation or a gap of 0.5 mm is sufficient for significantly reducing the iron losses by 50% and to thus reduce or limit the heating of the magnetic circuit. Such a separation of the magnetic circuit has little impact on the secondary current when the primary current is at a nominal operating current. Advantageously, said gap is greater than 0.5 mm when the temperature is higher than 120° C.

Preferably, the mechanical device comprises from 6 to 12 bi-metal strips. In FIGS. 5 to 8, the embodiment of the mechanical limiting device comprises 8 strips of bi-metal material mounted head-to-tail.

The recess is preferably located in the magnetic circuit with a separation of a cutout section, as in the figures. However, the recess also can be disposed on an edge or outside the magnetic circuit or on a support causing the gap separation.

Figures 9, 10:
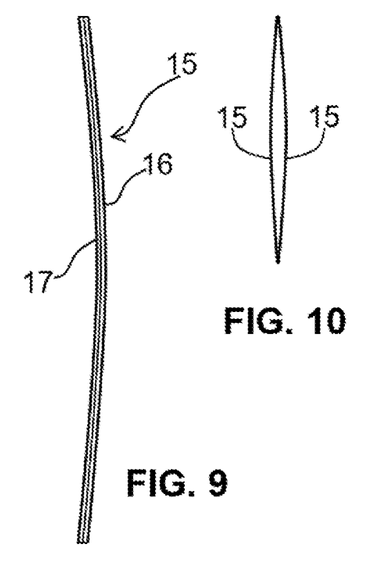
FIGS. 9 to 11 show details of strips forming the device for varying magnetization according to the first embodiment.
Figure 11:
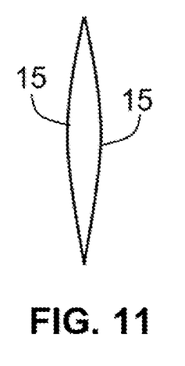

FIGS. 9 to 11 show details of strips forming the device for varying magnetization according to the first embodiment. An example of a bi-metal strip is shown in FIG. 9, a first face 16 of the strip is made up of a first material having a first expansion coefficient and a second face 17 is made up of a second material having a second expansion coefficient below the first expansion coefficient. FIG. 9 shows two strips 15 mounted head-to-tail or face-to-face at a low temperature, for example, 20° C., and FIG. 11 shows the same strips at a high temperature of approximately 130° C. The deformation of the strips is intended to push the walls of a section of the magnetic circuit in order to create a gap at a high temperature. In one embodiment, the size of each strip is 8.5 mm long, 3.00 mm wide and 0.6 mm thick. Thus, the movement or length is greater than 0.5 mm when the temperature is higher than 120° C. or the magnetic circuit experiences a temperature increase of 120 K. For a set of 8 strips, the movement is 0.6 mm. The movement with 10 strips will be approximately 0.74 mm. The bi-metal strip material preferably will be selected with a linear deformation of –20° C. to 200° C. This movement is a theoretical value that does not take into account the pressure of the return spring of the retention device 10. In practice, the movements can be slightly shorter as a function of the springs.

Figure 12:
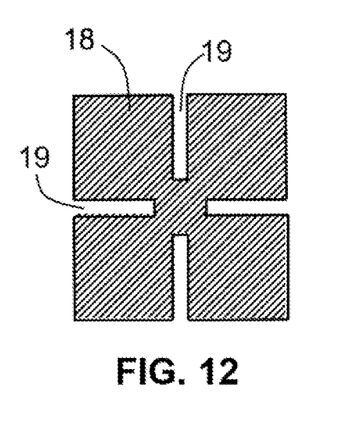
FIG. 12 shows a second static embodiment of a device for varying magnetization.

In order to avoid mechanical movements of the magnetic circuit, in a second embodiment of the device for limiting magnetic flux according to the temperature, the device for varying magnetization comprises a static device 18 housed in a section of said magnetic circuit. According to this second embodiment of the invention, the static device 18 is made up of a magnetic material having a Curie point or Curie temperature that is lower than that of the material of the magnetic circuit. The material of the static device 18 preferably has a Curie temperature that is between 80° C. and 200° C., for example, around 130° C. Advantageously, the material of the static device is predominantly made up of iron-nickel (FeNi) or of ferrite. Another example of this type of material is "Phytherm" by Aperam.

Thus, in order to limit the temperature of the magnetic circuit, said magnetic circuit comprises a cutout that can generate a gap. An element made of magnetic material with a low Curie point (Tc) is inserted into this cutout or opening. The magnetization of this material decreases according to the temperature until it is cancelled out for the temperature Tc. In the range of temperatures that does not exhibit any risks for the sensor, for example, below 120° C., the material has magnetic properties that allow normal operation of the sensor, while freely allowing the magnetic flux to pass through the opening. In this case, the power delivered by the sensor at low current levels is hardly affected. When approaching the defined limit temperature, the material sufficiently loses its magnetization in order to behave like air. The iron losses and the heating are then reduced, as in the first solution with bi-metal strips.

FIG. 12 shows an embodiment of a static device 18 for varying magnetization comprising cutouts 19 for avoiding eddy current losses. When the material is ferrite, cutouts are not necessary since this material is not a good electrical conductor or isolator.

Figure 13:
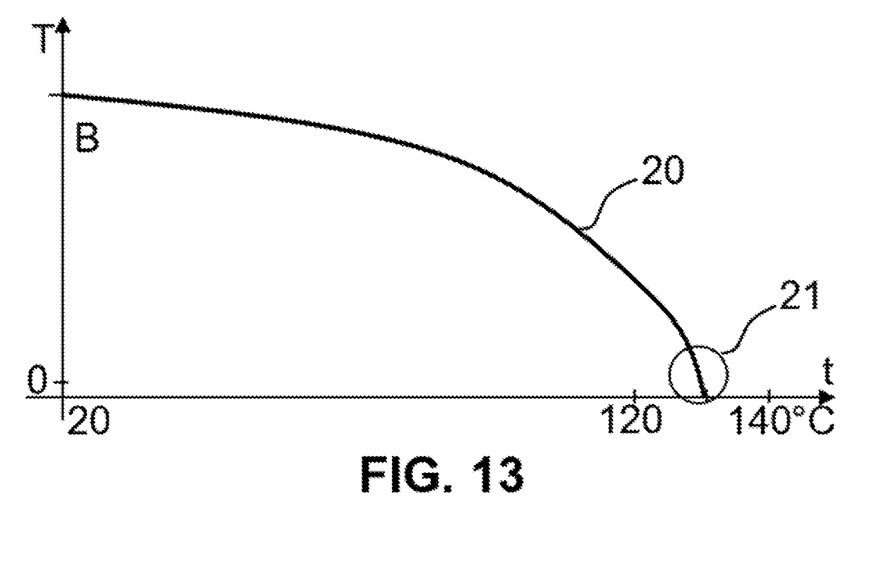
FIG. 13 shows a magnetization curve of a device for varying magnetization according to the temperature.

FIG. 13 shows a magnetization curve 20 of a device for varying magnetization according to the temperature. Around 20° C. the magnetization is still maximal. Then, when the temperature increases, the magnetization of the material decreases until it becomes practically zero when it exceeds the Curie point 21.

Figure 14:
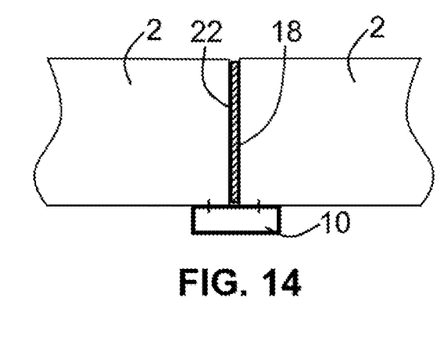
FIGS. 14 and 15 show arrangements of a second embodiment of a device for varying static magnetization.
Figure 15:
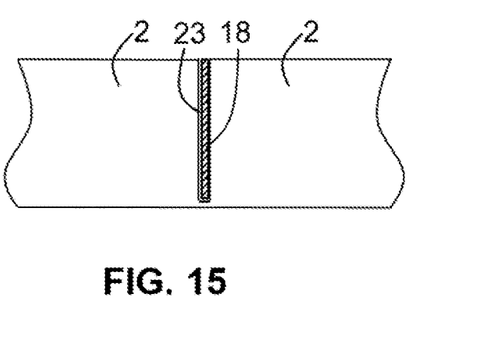

FIGS. 14 and 15 show arrangements according to the second embodiment of a device 18 for varying static magnetization for limiting the magnetic flux according to the temperature. The magnetic circuit comprises notches or openings for creating gaps at high temperatures. In FIG. 14, the gap will be complete since an opening 22 occupies the entire section. In this case, a retention device 10 prevents any movement of the magnetic circuit. In FIG. 15, the gap is partial with a notch 23 only occupying a portion of the section of the magnetic circuit. Thus, an element 18 made of magnetic material with a low Curie point (Tc) is inserted into the notches or openings 22 or 23. Preferably, the distance of the gap of the openings 22 or 23 is between 0.5 and 1 mm.

Figure 16:
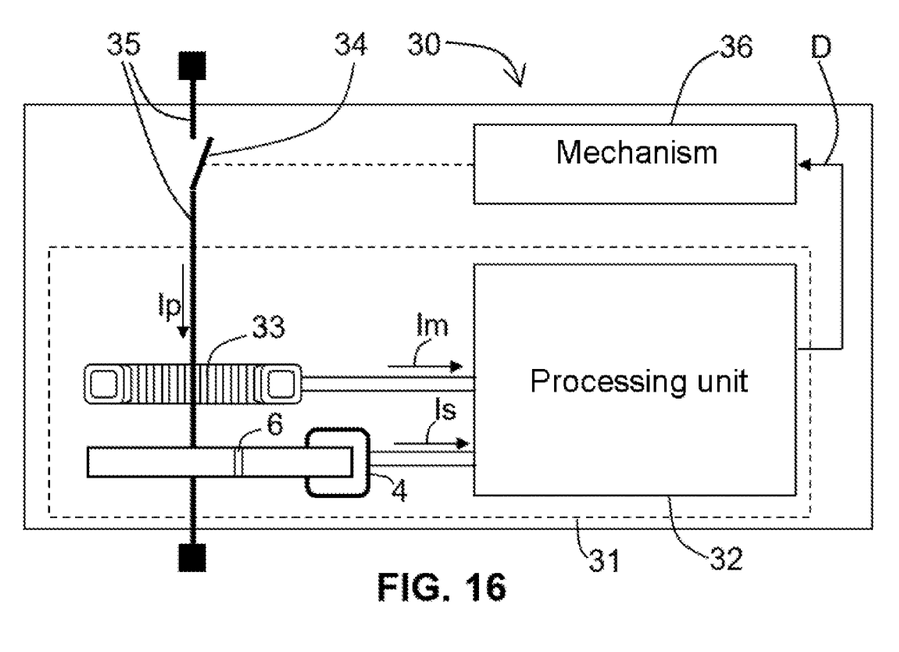
FIG. 16 shows a block diagram of a circuit breaker and of a protection device comprising a transformer according to one embodiment of the invention.

FIG. 16 shows a block diagram of a circuit breaker 30 and a protection device 31 comprising a transformer 1 according to one embodiment of the invention.

The electronic protection device 31 comprises an electronic processing unit 32 connected to at least one current transformer and delivering an electronic signal D in response to protection functions. The protection device comprises a current transformer 1 according to an embodiment of the invention for varying magnetization. The transformer 1 has a secondary winding 4 connected to the processing unit 32 for delivering a secondary measurement or electrical power supply current Is. In the particular case of FIG. 16, the protection device comprises a current transformer 1 with a device for varying magnetization according to the temperature for powering the processing unit 32 and a current sensor 33 for delivering a current measurement signal Im to the processing unit.

The electrical circuit breaker 30 comprises at least one main contact 34 for interrupting a current Ip in an electrical circuit 35, a mechanism 36 for controlling the opening of said electrical contact 34 and a protection device 31 delivering a control signal D to said control mechanism 36. This circuit breaker comprises at least one current transformer 1 with a device for varying magnetization according to the temperature for powering the processing unit 32 of the protection device 31. The primary conductor 3, forming part of the electrical circuit 35, passes through the inside of the magnetic circuit 2 of the current transformer 1.

The invention claimed is:

1. A current transformer comprising:
   a magnetic circuit made of magnetic material that is intended to be placed around a primary conductor; and
   a secondary winding that is wound onto a first portion of said magnetic circuit in order to deliver a secondary current to a processing circuit,
   wherein the magnetic circuit comprises at least one device for varying magnetization of a second portion of said magnetic circuit, that is separate from the first portion, according to a temperature in order to limit or to decrease a magnetic flux in the magnetic circuit when the temperature of the magnetic circuit increases.

2. The current transformer according to claim 1, wherein the device for varying magnetization limits circulation of the magnetic flux to a value that is less than 50% of the value at 20° C. when the temperature is higher than 150° C.

3. The current transformer according to claim 1, wherein the device for varying magnetization creates an additional complete or partial gap in the magnetic circuit in order to limit the circulation of the magnetic flux when the temperature exceeds a predetermined threshold.

4. The current transformer according to claim 3, wherein said predetermined threshold is between 120° C. and 180° C.

5. The current transformer according to claim 3, wherein the device for varying magnetization comprises a mechanical device housed in a recess of the magnetic circuit in order to produce a gap or to increase a gap by opening the magnetic circuit when the temperature reaches said predetermined threshold, the recess being formed at the second portion of the magnetic circuit which is at an opposite end of the magnetic circuit with regard to the first portion.

6. The current transformer according to claim 5, wherein the mechanical device comprises bi-metal strips, which are mounted head-to-tail and are housed in a recess in order to effect a separation of the magnetic circuit, generating a gap.

7. The current transformer according to claim 6, wherein the mechanical device comprises from 6 to 12 strips of bi-metal.

8. The current transformer according to claim 6, wherein said gap is greater than 0.5 mm when the temperature is higher than 120° C. or the magnetic circuit experiences a temperature increase of 120 K.

9. The current transformer according to claim 1, wherein the device for varying magnetization comprises a static device housed in a section of said magnetic circuit, said static device being made up of a magnetic material having a Curie point or a Curie temperature that is lower than that of the magnetic material of the magnetic circuit.

10. The current transformer according to claim 9, wherein the material of the static device has a Curie temperature between 80° C. and 200° C.

11. The current transformer according to claim 9, wherein the material of the static device is predominantly made up of iron-nickel or of ferrite.

12. The current transformer according to claim 9, wherein the material of the static device comprises cutouts for avoiding current losses through eddy currents.

13. An electronic protection device comprising an electronic processing unit connected to at least one current transformer and delivering an electronic signal in response to protection functions, said device further comprises a current transformer according to claim 1 having a secondary winding connected to said processing unit in order to deliver a secondary measurement or electrical power supply current.

14. An electrical circuit breaker comprising at least one main electrical contact for interrupting a current in an electrical circuit, a mechanism for controlling the opening of said electrical contact and a protection device delivering a control signal to said control mechanism, wherein at least one current transformer according to claim 1 connected to a processing unit of said protection device.

\* \* \* \* \*